United States Patent [19]

Ariizumi et al.

[11] Patent Number: 4,712,576
[45] Date of Patent: Dec. 15, 1987

[54] PNEUMATICALLY OPERATED VALVE

[75] Inventors: Ryozo Ariizumi, Ohmiya; Takashi Ejiri, Tokyo, both of Japan

[73] Assignee: Fujikura Rubber Limited, Tokyo, Japan

[21] Appl. No.: 824,905

[22] Filed: Jan. 31, 1986

[30] Foreign Application Priority Data

Mar. 29, 1985 [JP] Japan .................. 60-63224
Mar. 29, 1985 [JP] Japan .................. 60-63225
Jul. 3, 1985 [JP] Japan ............. 60-100479[U]

[51] Int. Cl.⁴ .................. F16K 31/122; F16K 1/48
[52] U.S. Cl. .................. 437/270; 251/63.5; 251/88; 92/59; 92/182
[58] Field of Search .......... 251/63.5, 63.6, 88; 137/270; 92/182, 59

[56] References Cited

U.S. PATENT DOCUMENTS

| | | | |
|---|---|---|---|
| 1,551,436 | 8/1925 | Stacy | 251/88 |
| 3,122,065 | 2/1964 | Laun | 137/270 X |
| 3,789,875 | 2/1974 | McGee | 251/63.6 X |
| 4,103,863 | 8/1978 | Houlgrave et al. | 251/63.5 X |
| 4,526,341 | 7/1985 | Thomas | 251/63.5 |

FOREIGN PATENT DOCUMENTS 748074  7/1980  U.S.S.R. .................. 137/270

OTHER PUBLICATIONS

Nupro Company, "Air Operated Bellows Valves", Willoughby, Ohio, Apr., 1984, pp. 1-8.

Primary Examiner—Arnold Rosenthal
Attorney, Agent, or Firm—Flynn, Thiel, Boutell & Tanis

[57] ABSTRACT

An improved pneumatically operated valve for controlling supply of fluid to a certain apparatus adapted to be operated for an intended purpose using the thus supplied fluid. The valve includes a valve portion on the piston rod and a flow passage of fluid is normally kept in the opened state or in the closed state by means of a the valve portion under the effect of force exerted on the piston in a predetermined direction. When any abnormal fluctuation of pressure of fluid is detected, pressurized air is introduced into the interior on the casing so ast to exert its pressure on the pistion against the aforesaid force of the piston, whereby the flow passage is shifted from the opened state to the closed state or from the closed state to the opened state. Both a normally opened type pneumatically operated valve and a normally closed type pneumatically operated valve can be constituted using parts and components having the same shape and dimension, merely by changing the direction of assembling of a certain member.

18 Claims, 4 Drawing Figures

PNEUMATICALLY OPERATED VALVE

FIELD OF THE INVENTION

The present invention relates to a pneumatically operated valve.

BACKGROUND OF THE INVENTION

The present invention relates to a pneumatically operated valve for controlling supply of a fluid to a certain apparatus adapted to be operated for an intended purpose using the thus supplied fluid, and more particularly to improvement of or relating to a pneumatically operated valve of the type in which a flow passage of fluid is normally kept in the opened state or in the closed state by means of a valve portion of the piston rod under the effect of a force exerted on the piston in a predetermined direction and. When any abnormal fluctuation of pressure of fluid is detected, pressurized air is introduced into the interior of the casing so as to allow its pressure to act on the piston against the aforesaid force so that the flow passage is shifted from the opened state to the closed state or from the closed state, to the opened state whereby both a normally opened type pneumatically operated valve and a normally closed type pneumatically operated valve can be constituted using parts and components having the same shape and dimension, merely by changing the direction of assembling of a certain member.

DESCRIPTION OF THE PRIOR ART

As is well known to any expert in the art, pneumatically operated valves are classified into two types, one of them being a normally opened type pneumatically operated valve in which a flow passage of fluid is normally kept in the opened state by means of a valve portion of the piston rod under the effect of a force exerted on the piston in a predetermined direction and in which, when any abnormal fluctuation of pressure of fluid is detected, the flow passage is shifted from the opened state to the closed state by introducing into the interior of the casing pressurized air which acts against the aforesaid force on the piston, and the other type being a normally closed type pneumatically operated valve in which a flow passage of fluid is normally closed with a valve portion of the piston under the effect of a force exerted on the piston and in which, when any abnormal fluctuation of pressure of fluid is detected, the flow passage is shifted from the closed state to the opened state by introducing pressurized air which acts against the aforesaid force on the piston.

Both the conventional normally opened type and normally closed type pneumatically operated valves are constructed using parts and components which are almost all designed in different shape and dimension, although a part of them are designed in same shape and dimension. For this reason those parts and components can not be used in two ways as a substitute respectively, and this leads to problems that a large number of parts and components are required to build the conventional valves and their assembling can be achieved only by consuming many manhours because the assembling operation can not be performed in the same manner.

Moreover, when a pneumatically operated valve is employed for the purpose of controlling flow of the pure water that is used for cleaning integrated circuit boards or the like, the pneumatically operated valve needs reliable cleaning of parts and components constituting the valve before their assembling in order to inhibit dust or like foreign material from entering therein. However, due to the fact that many members made of elastomeric material such as an O-ring or the like are used to build a valve, there is a fear of damaging or injuring said members when they are cleaned using supersonic or a similar intensive energy. If valve members such as an O-ring or the like are cleaned after their removal from the valve, there occurs a necessity for reassembling them after completion of the cleaning operation. This means increase opportunities of contact with valve members during the assembling operation, resulting in increased adhesion of dust or the like foreign material to them. Further it is unavoidable that members which come in contact with fluid become contaminated after usage for a predetermined period of time, but the contaminated member in conventional valves can not be easily removed therefrom, and therefore a cleaning operation is generally performed for contaminated members only with many difficulties.

Both normally opened type and normally closed type pneumatically operated valves are generally constructed such that their operation of opening and closing is controlled by using pressurized air. For this reason the conventional valve requires excellently high airtightness. However, due to the fact that the casing in which the piston is slidably accommodated is designed in a cylindrical configuration of which both ends are opened, one of them being closed with a cover, many manhours are required for performing the assembling operation because of a necessity for maintaining airtightness in the area between the cylindrical casing and the cover, and the thus assembled casing causes another problem such as leakage of control air from the joint of this assembling, resulting in low airtightness of the valve.

SUMMARY OF THE INVENTION

Hence, the present invention has been made to obviate the above mentioned defects and its object resides in providing a pneumatically operated valve which assures that both normally opened type and normally closed type pneumatically operated valves are built merely by changing the direction of assembling of a certain member.

Another object of the present invention is to provide a pneumatically operated valve which is constructed with a reduced number of parts and components, is assembled by way of the same steps and can be manufactured at a high productive efficiency and an inexpensive cost.

Another object of the present invention is to provide a pneumatically operated valve which is so constructed that the piston rod is constituted by the combination of two separately formed members, that is, one member adapted to come in contact with clean fluid and having no fear of being damaged or injured by supersonic cleaning and the other member including O-rings or the like which tend to be damaged or injured during a cleaning operation using supersonic energy, which assures (1) that the one member adapted to come in contact with clean liquid is reliably cleaned by performing a cleaning operation separately for both the other member and the one member during manufacturing of the valve in a factory without occurrence of contamination with cleaning liquid, (2) that opportunities of contact with members constituting the piston rod are reduced remarkably during the assembling operation by simplifying the assembling operation and as a result preventing adhesion of dust or the like foreign material, (3) that both the other member and the one member are easily disconnected from one another so as not to hinder the cleaning operation for the members when the member which comes in contact with the fluid becomes unavoidably contaminated after usage for a predetermined period of time, and (4) that opportunity of contact with the members during a reassembling operation is minimized so as to inhibit dust or foreign material from being adhered to the members during the reassembling operation.

Further, another object of the present invention is to provide a pneumatically operated valve serving as both a normally opened type and normally closed type pneumatically operated valve which is so constructed that the casing in which the piston is slidably accommodated is designed as an integral structure comprising a cylindrical portion and an upper wall so as to inhibit occurrence of leakage and which requires no assembling operation for maintaining airtightness in the area between the cylindrical portion and the cover.

Still further, another object of the present invention is to provide a pneumatically operated valve which is operated with excellently high reliability and can be manufactured at a high productive efficiency and an inexpensive cost.

Other objects, features and advantages of the invention will become readily apparent from reading of the following description which has been prepared in conjunction with the accompanying drawings.

BRIEF DESCRIPTION OF THE DRAWINGS

The accompanying drawings will be briefly described below.

DESCRIPTION OF THE PREFERRED EMBODIMENTS

Now, the present invention will be described in greater detail hereunder with reference to the accompanying drawings which illustrate preferred embodiments thereof.

Figure 1:
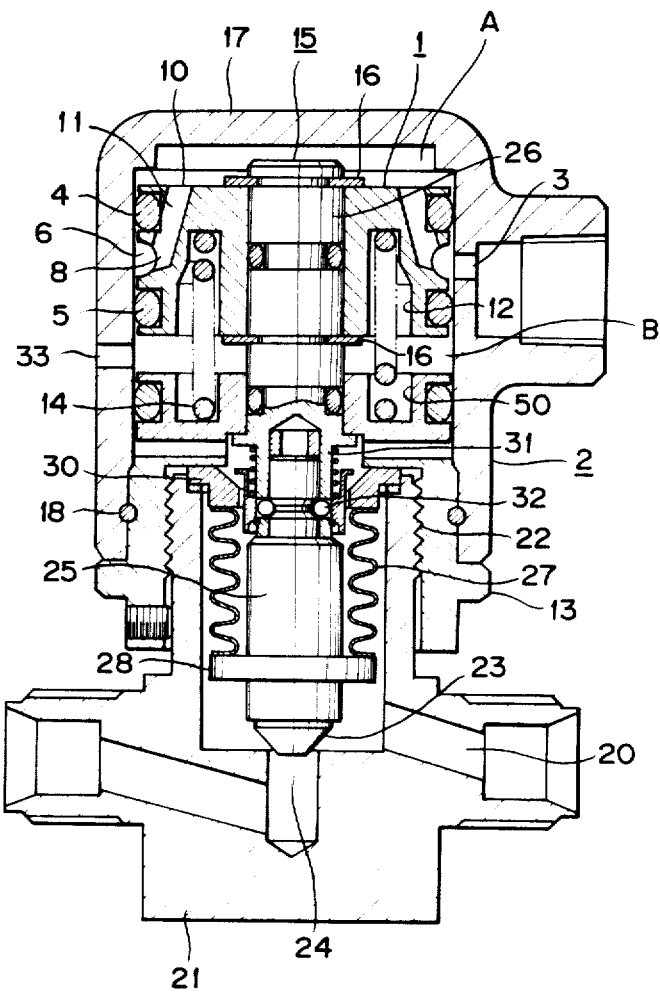
FIG. 1 is a vertical sectional view of a pneumatically operated valve in accordance with an embodiment of the invention, wherein the valve is constructed as a normally opened type pneumatically operated valve.

First, description will be made below as to the first embodiment of the invention which is applied to a normally opened type pneumatically operated valve with reference to FIG. 1. In the drawing reference numeral 1 designates a piston which is slidably inserted into a cylindrical casing 2 having an inverted U-shaped sectional configuration. The casing 2 is formed with an inlet port 3 on the right-hand side wall, through which control air is introduced thereinto. The valve is provided onto the outer surface of the piston 1 with two sealing portions 4 and 5 adapted to be in airtight contact with the inner wall of the casing 2 and an O-ring is fitted into each of the sealing portions 4 and 5 with an annular space 6 located therebetween. The piston 1 is formed with a controlling passage 11 which extends therethrough in the upwardly inclined direction, the one end 8 of the controlling passage 11 being opened at the annular space 6 and the other end 10 of the same being opened at the upper surface of the piston 1. Further, the piston 1 is formed with an annular recess 12 which is located opposite to the upper opened end 10 of the controlling passage 11. As is apparent from the drawing, the valve includes a main body 13 which is formed with an annular recess 50 at the upper part thereof corresponding to the annular recess 12 of the piston 1, and a compressive spring 14 is accommodated between both of the annular recesses 12 and 50, whereby the piston 1 is normally urged in a predetermined direction (in the upward direction as seen in FIG. 1) under the effect of the resilient force of the compressive spring 14. It should be noted that an upper chamber A and a lower chamber B are defined by the piston 1, that is, the upper chamber A is located above the piston 1 and the lower chamber B is located below the same. The piston 1 is fixedly fitted with a piston rod 15 by means of two snap rings 16, and the annular space 6 between both of the sealing portions 4 and 5 is aligned with the inlet port 3 and the opened end 10 of the controlling passage 11 is exposed to the upper wall 17 of the casing 2 while the piston 1 is affected by the resilient force of the compressive spring 14. Once control air is introduced into the casing 2 through the inlet port 3, it flows into the upper chamber A via the controlling passage 11 in the piston 1 and thereby the latter is displaced toward the lower chamber B (in the downward direction as seen in FIG. 1) against the resilient force of the compressive spring 14.

The casing 2 is mounted turnable relative to the main body 13 with the aid of a lock ring 18 which is located at the position in the proximity of the lower end of the casing 2. In particular, and as evident from FIG. 1, the casing 2 has a radially inwardly facing cylindrical surface which slidably engages a radially outwardly facing cylindrical surface on the main body 13, the ring 18 being disposed in aligned annular grooves provided in these cylindrical surfaces. A connector 21 with a flow passage 20 formed therein is threadably engaged to the inner wall of the main body 13 via a male thread portion 22 in such a manner that the lower end part of the piston rod 15 enters the cylindrical hollow space of the connector 21. The piston rod 15 is provided with a valve portion 23 at the lowermost end which is orientated toward a valve seat 24 in the flow passage 20 through which the controlling medium flows for an intended purpose. It should be noted that the position of the valve portion 23 is so determined that the flow passage 20 is normally not closed with it.

Refering to FIG. 1 again, the piston rod 15 is constituted by the combination of one member 25 corresponding to the lower part and the other member 26 corresponding to the upper part thereof, and a part of the one member 25 is covered with a bellows 27 in order to protect the controlling medium flowing through the flow passage 20 from contamination which may be caused by contact with the one member 25 of the piston rod 15. Specifically, the lower end of the bellows 27 is fixedly attached to the flange portion 28 projecting from the one member 25, in such a manner that the piston rod 15 is freely displaced up and down within the bellows 27. The upper end of the latter is fixedly attached also to a bellows flange 30 which is inserted and fixed in the space defined between the main body 13 and the connecter 21, whereby the one member 25 of the piston rod 15 is fully surrounded by the bellows 27. Connecting of the one member 25 to the other member 26 is effected in the following manner. The other member 26 is provided with a plurality of engagement balls 32 which are accommodated in holes in an engagement sleeve 31 projected downwardly of the lower end thereof, and the one member 25 is connected with the other member 26 with the aid balls the engagement of 32 in that the upper end of the other member 25 is inserted within the sleeve 31 of the other member 26.

In the illustrated case an air port 33 is drilled through the left-hand side wall of the casing 2 in order that air is introduced into or discharged from the interior of the casing 2 therethrough as the piston is displaced upwardly or downwardly. However, an air port such as the air port 33 is not always required, particularly in the case where the piston 1 has a short distance of displacement.

As will be readily apparent from the above description, the valve portion 23 of the piston rod 15 assumes the position where the flow passage 20 of the controlling medium is normally opened under the effect of the resilient force of the compressive spring 14 which is exerted on the piston 1. If any abnormal fluctuation of pressure of the controlling medium is detected, pressurized air is introduced into the upper chamber A via the inlet port 3 and the controlling passage 11, whereby the piston 1 is displaced downwardly against the resilient force of the compressive spring 14 until the valve seat 24 in the flow passage 20 is closed with the valve portion 23.

The present invention has been described above with respect to the embodiment where it is applied to a normally opened type pneumatically operated valve, but it should not be limited only to this. Alternatively, it may be applied to a normally closed type pneumatically operated valve. Hence, description will be made below as to the second embodiment of the invention which is applied to this normally closed type valve with reference to FIG. 2. In this embodiment, securing of the piston 1 to the piston rod 15 is achieved in a reverse orientation relative to the foregoing embodiment which is concerned with a normally opened type valve. Specifically, the piston 1 is fixedly fitted onto the piston rod upside down by means of the snap rings 16 and a compressive spring 14 is accommodated in the space as defined between the annular recess 12 and the piston 1 and the upper wall 17 of the casing 2 while it is exposed to the upper chamber A. The other end 10 of the controlling passage 11 is opened toward the lower chamber B which is located below the piston 1, and the spring 14 urges the piston downwardly so that the valve portion 23 is maintaned in the normally closed state in which it comes in contact with the valve seat of the flow passage 20. When any abnormal fluctuation of pressure of the flowing medium flowing into the normally closed type valve is detected, control air is introduced into the lower chamber B via the inlet port 3 and the controlling passage 11 and thereby the piston 1 is displaced toward the upper wall 17 of the casing 2 against the resilient force of the compressive spring 14, which is accommodated between the annular recess 12 and the upper wall 17. As a result, the flow passage 20 is opened and the valve is shifted from the closed state to the opened state. It should be noted that same or similar parts and components as those in the first embodiment are identified by the same reference numerals and therefore their repeated description will not be required.

Figure 2:
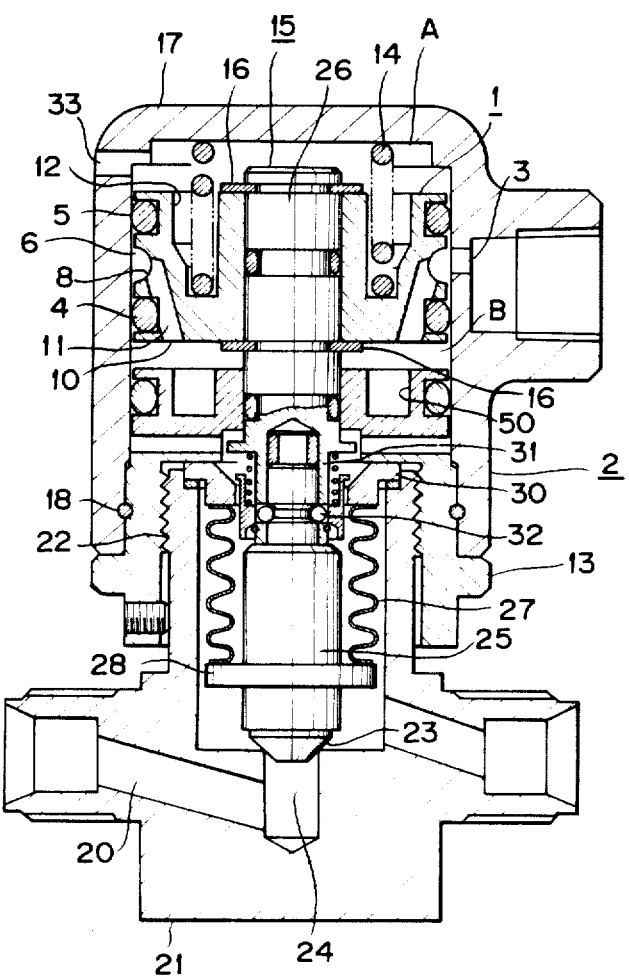
FIG. 2 is a vertical sectional view of a pneumatically operated valve in accordance with another embodiment of the invention, wherein the valve is constructed as a normally closed type pneumatically operated valve.

As will be readily apparent from comparison between FIGS. 1 and 2, the present invention consists in that a distance between the lower end of the piston 1 and the upper end of the main body 13, in the normally assembled state where the piston 1 is fixedly fitted onto the piston rod 15 and the compressive spring 14 is accommodated between the upper annular recess 12 and the lower annular recess 50 as a normally opened type valve, that is, the size of the lower chamber B as measured in the vertical direction in FIG. 1, is the same in dimension as a distance between the upper end of the piston 1 and the upper wall 17 of the casing 2 in the reversely assembled state where the compressive spring 14 is accommodated between the annular recess 12 and the upper wall 17 of the casing 2 as a normally closed type valve, that is, the size of the upper chamber A in FIG. 2. Moreover, the compressive spring 14 employed for both the normally opened type valve and the normally closed type valve is designed with the same dimensions and in the same configuration. However, it should of course be understood that the compressive spring 14 for the normally opened type valve is designed in a different manner from that for the normally closed type valve in dependence on many factors such as the purpose of controlling the operation of a flowing medium, the pressure of fluid introduced into the flowing passage 20, or the like, and the difference therebetween can be properly compensated in accordance with the present invention, as required.

Incidentally, the terms "upper" and "lower" as seen in the specification represent the positional terms "upper" and "lower" relative to the drawings and therefore they are not intended to strictly define the content or the scope of the invention. In some practical case when the pneumatically operated valve of the invention is used, "upper" and "lower" positions become "lower" and "upper" position or "fore" and "rear" positions or "left" and "right" positions in dependence on how the valve is mounted or arranged for a certain purpose. It should of course be considered that such a positional change or shift as mentioned above is included within the scope of the invention without any departure from the spirit thereof.

Since the pneumatically operated valve of the invention is so constructed that, when the piston 1 is fitted onto the piston rod 15 in the normally assembled state, control air is introduced toward the one surface of the piston 1 via the inlet port while the one surface of the piston 1 and the other opened end 10 of the controlling passage 11 assume their normal position and, when the piston 1 is fitted onto the piston rod 15 in the reversely assembled state, control air is introduced toward the one surface of the piston 1 via the inlet port while the one surface of the piston 1 and the other opened end 11 of the controlling passage 10 assume their reverse position, it is assured that both a normally opened type pneumatically operated valve and a normally closed type pneumatically operated valve are constituted with the use of same parts and components, merely by changing the direction of fitting of the piston 1 onto the piston rod 15. This leads to advantageous features in that the number of parts and components can be reduced remarkably compared with the conventional valve and an assembling operation can be performed by way of the same steps. As a result, the valve of the invention can be manufactured at a high productive efficiency and an inexpensive cost. Further, since the piston 1 includes a plurality of sealing portions over the outer wall which are spaced away from one another, it is assured that the piston 1 comes in contact with the inside wall of the casing 2 at plural positions and thereby it is held stably within the casing 2 without any occurrence of rattling movement or a like malfunction during sliding of the piston 1. Thus, a pneumatically operated valve having excellently high operational reliability has been provided in accordance with the present invention.

Figure 3:
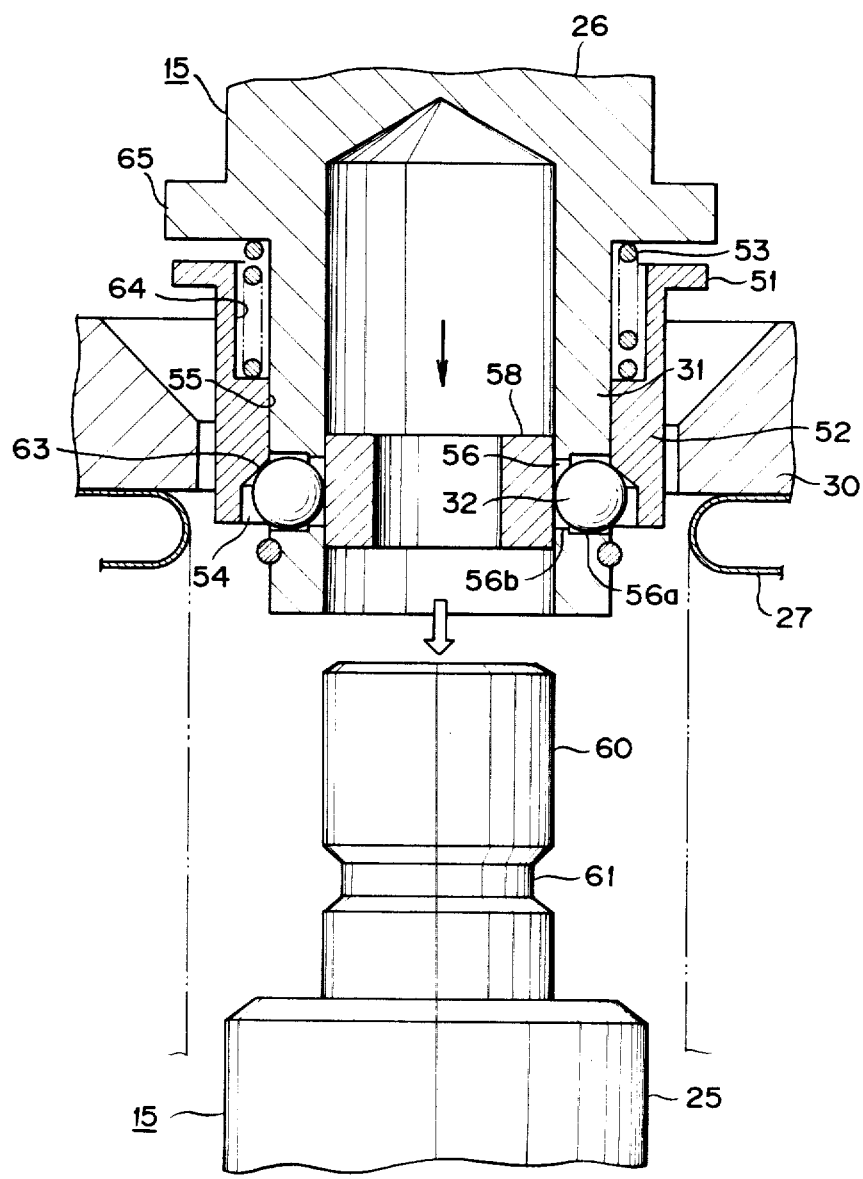
FIG. 3 is an enlarged fragmental vertical sectional view of the valve of the invention, particularly showing the inoperative state where the one member is disconnected from the other member.
Figure 4:
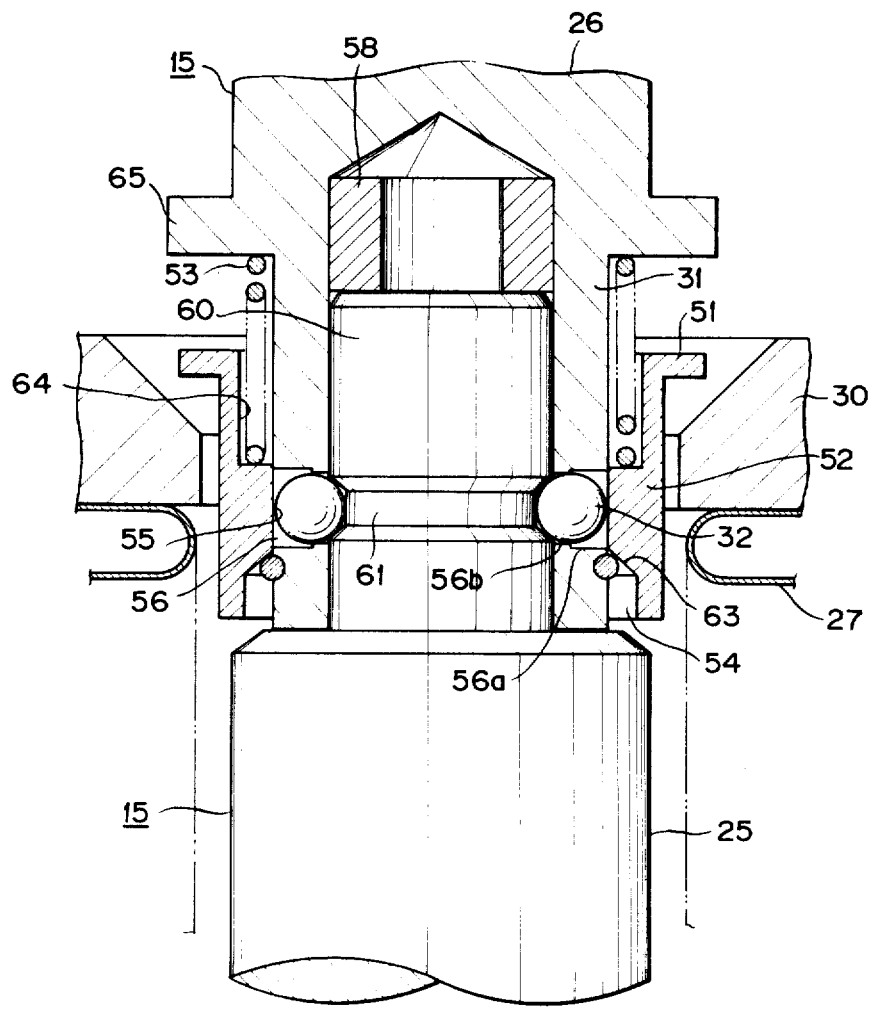
FIG. 4 is an enlarged fragmental vertical sectional view of the valve of the invention, particularly showing the operative state where the one member is operatively connected to the other member.

Next, description will be made below as to how the one member 25 is operatively connected to the other member 26 with reference to FIGS. 3 and 4.

The other member 26 has an engagement sleeve 31 projected therefrom toward the one member 25 and another sleeve 52 is slidably fitted onto the engagement sleeve 31. As is apparent from the drawing, an engagement flange 51 is made integral with the sleeve 52 which is slidably fitted onto the engagement sleeve 31, and the sleeve 52 is urged toward the one member 25 under the effect of the resilient force of a coil spring 53. The opening through the sleeve 52 is formed with an enlarged portion 54 at the lower end part, of which the inner diameter is dimensioned larger than that of the rest of the opening through the sleeve 52 and the enlarged portion 54 is connected to a central portion 55 of the opening located at the middle area of the sleeve 52 and closely engaging the engagement sleeve 31 via an inclined part 63. On the other hand, the sleeve 52 is formed with an insert recess 64 at the upper end into which the spring 53 is inserted in such a manner that its upper end abuts against the bottom surface of a flange 65 of the other member 26. Further, the engagement sleeve 31 has a plurality of holes 56 formed around the periphery thereof in a spaced relation as seen in the peripheral direction and an engagement ball 32 having an outer diameter appreciably smaller than the inner diameter of the outer part 56a of the hole 56 but appreciably larger than the inner diameter of the inner part 56b of the same is fitted into each of the hole 56. To inhibit the engagement balls 32 from being projected inwardly into the engagement sleeve 32 after they are fitted into the holes 56, an insert collar 58 is previously fitted into the engagement sleeve 31 at the shown position. Obviously, the insert collar 58 is adapted to slide within the engagement sleeve 31. To this end, as shown in FIG. 2, the engagement balls 32 are projected outwardly of the holes 56 but not inwardly of the same, whereby they are partially accommodated within the enlarged portion 54 of the sleeve 52. On the other hand, the one member 25 includes an engagement stem 60 on the upper end thereof which is projected therefrom toward the other member 26 to slidably move the insert collar 58 as it is inserted into the engagement sleeve 31. The engagement stem 60 has formed on the outer surface in a peripheral direction an annular engagement recess or groove 61 into which enters the balls 32 projected inwardly from the holes 56 and the position of the groove 61 is so determined that the groove 61 is located in alignment with the holes 56 when the engagement stem 60 is fitted into the engagement sleeve 31 has displaced the insert collar 58 upwardly to the position away from the holes 56 by the thrusting operation. On completion of fitting of the engagement stem 60, the engagement balls 31 are ready to project inwardly of the hole 56. At this moment the sleeve 52 is forcibly depressed under the effect of the resilient force of the spring 53 and the inclined part 63 of the sleeve 52 displaces the engagement balls 32 inwardly while the depressing portion of the same inhibits the said balls 32 from being displaced outwardly. Thus, the one member 25 is operatively connected to the other member 26 as shown in FIG. 4 by displacing the engagement balls 32 inwardly on completion of downward movement of the sleeve 52 along the outer surface of the engagement sleeve 31 in the above-described manner. If necessary, the one member 25 can be disconnected from the other member 26 as shown in FIG. 3 by displacing the engagement balls 32 to the inoperative position while the sleeve 52 is displaced upwardly against the resilient force of the spring 53.

Before, the assembling operation is performed for the piston rod 15, it is required first that the one member 25 and the other member 26 are cleaned separately. It should be noted that cleaning is carefully effected for the one member 25 which comes in direct contact with clean fluid, whereas cleaning is effected for the other member 26 in such a manner that the sealing portions 4 and 5 in the form of O-rings are not damaged or injured during the cleaning operation. After completion of cleaning of the one member 25, the engagement stem 60 of the said member 25 is fitted into the engagement sleeve 31 of the other member 26 and thereby the insert collar 58 is slidably displaced upwardly by means of the engagement stem 60 until the insert collar 58 is parted away from the engagement balls 32. Now, the balls 32 are ready to move inwardly. As the sleeve 52 is slidably displaced downwardly under the effect of the resilient force of the spring 53, the engagement balls 32 are caused to partially enter the annular engagement groove 61 of the engagement stem 60 under the force of the depressed portion 55 while the residual part of the engagement balls 32 is retained in the holes 56. As a result, the one member 25 is operatively connected to the other member 26 by way of the engagement balls 32. This means that assembling of the piston rod 15 can be automatically achieved with the aid of a cleaned automatic machine without any necessity for manual contact with the one member 25 and the other member 26. The assembling is completed by threadably engaging the main body 13 to the connector 21.

When it is found that the bellows 27 and other parts become contaminated after their usage for a predetermined period of time, the one member 25 is disconnected from the other member 26 so that they are ready to be cleaned. Specifically, disconnecting of the one member 25 from the other member 26 is carried out by way of the steps of disengaging the connector 21 from the thread portion 22 of the main body 13, fitting to the engagement flange 51 of the sleeve 52 a suitable tool which is inserted through the upper end opening of the bellows flange 30, slidably displacing the sleeve 52 upwardly against the resilient force of the spring 53 with the aid of the tool, fitting another suitable tool to the insert collar 8 to displace the said collar 58 downwardly to the position where it is located in alignment with the holes 56, and then causing the engagement balls 32 to move toward the enlarged portion 54 which holds outwardly the balls 32 in the sleeve 52. After completion of disconnecting operation in that way both the one member 25 and the other member 26 can be cleaned separately. Accordingly, in the case where members adapted to come in contact with fluid become contaminated unavoidably after usage for a predetermined period of time, the one member 25 and the bellows 27 which are contaminated with foreign material in the flowing fluid can be cleaned after separating the one member 25 from the other member. As a result, the one member 25 and the bellows 27 are always kept clean.

In the illustrated embodiments the valve is so constructed that the other member 26 includes an engagement sleeve 31 and the one member 25 includes an engagement stem 60. However, the present invention should not be limited only to this. Alternatively, the valve may be so constructed that the one member 25 includes an engagement sleeve 31 and the other mamber 26 includes an engagement stem 60 in a reverse manner without any recognition of difference in function and effectiveness.

As described above, the present invention involves the other member 26, including the piston rod 15 and O-rings which tend to be easily damaged or injured by supersonic cleaning, being designed separate from the one member 25 adapted to come in contact with clean flowing medium but not including O-rings or the like which tend to be damaged or injured by supersonic cleaning. Thus, during manufacturing of the valve, the cleaning operation is performed separately for the one member 25 and the other member 26. This leads to a characterizing feature in that the one member adapted to come in contact with a clean flowing medium can be cleaned reliably without any possibility of causing contamination after completion of the cleaning operation. Other characterizing features of the invention are that assembling is achieved simply and the occurrence of contact with the parts and components constituting the piston during the assembling operation is minimized and the possibility of causing adhesion of dust or the like foreign material to both the one and the other members during the assembling operation is reduced substantially. Further, since the one member 25 can be easily disconnected from the other member 26 by sliding movement of the sleeve, the one member 25 which becomes unavoidably contaminated according to the contact with flowing the medium can be cleaned while the other member 26 is disconnected therefrom. Thus, the one member 25 is always kept in the cleaned state. When the engagement balls are held in the outwardly displaced state by means of the insert collar during the cleaning operation before the assembling operation, there does not occur protrusion of the engagement balls into the joint area where the one member 25 is operatively connected to the other member 26. After completion of the cleaning operation, either of the one member 25 and the other member 26 is fitted into the engagement sleeve and thereby the insert collar is slidably displaced upwardly in the engagement sleeve until the engagement balls are released from the holding state, resulting in the engagement balls being protruded into the engagement sleeve. This means that the assembling operation can be performed by using a cleaned automatic machine without any necessity for manual contact with the one member 25 and the other member 26, contact of the first member with parts and components constituting the piston during assembling operation is minimized, and adhesion of dust or the like foreign material to the said parts and components during assembling operation is prevented effectively.

As will be readily apparent from the above description, the valve of the invention is so constructed that a casing 2 with a piston 1 slidably accommodated therein is constituted by the combination of a cylindrical portion and an upper wall 17 in an integral structure. For this reason there is no necessity for performing the assembling operation under the airtight condition as will be seen with the conventional valve which is designed such that the cylindrical body is separate from the cover. Other advantageous features of the invention are that manhours required for the assembling operation can be reduced remarkably, airtight sealing members such as O-rings or the like are not required for the casing area, and more reliably airtightness is assured than with the conventional valve including a cover. Further, since the casing 2 is turnably mounted on the main body 13 with the aid of the lock ring 18, the inlet port 3 through which control air is introduced into the interior of the casing can freely assume any orientation within the range of 360 degrees. Thus, connection of the valve of the invention to a control apparatus (not shown) can be achieved without any restriction with respect to orientation of the inlet port.

What is claimed is:

1. In a pneumatically operated valve which includes a passage through which a fluid can flow, a casing having a piston chamber therein, a piston slidably supported in the piston chamber for reciprocal movement and having a piston rod thereon, the piston rod having a valve portion thereon and the piston being movable between first and second positions in which the valve portion of the piston rod respectively permits and obstructs fluid flow through the passage, means for exerting a force on the piston which yieldably urges it in a predetermined direction toward one of its first and second positions, and means responsive to a predetermined fluctuation of fluid pressure in the passage for effecting movement of the piston by introducing pressurized air into the piston chamber in a manner causing it to act on the piston in a direction opposite the predetermined direction against said force exerted on the piston, the improvement comprising wherein the means for effecting movement of the piston includes an inlet port through which the pressurized air is introduced into the piston chamber in the casing being provided in a side wall of the casing in which the piston is accommodated slidably, wherein two sealing portions in airtight contact with an inner wall of the casing are provided on an outer surface of the piston in a spaced relationship so that an annular space is formed between them, and wherein the means for effecting movement of the piston includes a controlling passage provided through the piston, one end of said controlling passage opening into said annular space and the other end thereof opening through a surface of the piston which faces generally in said predetermined direction.

2. A pneumatically operated valve as defined in claim 1, wherein the valve includes a main body, and wherein the casing is rotatably supported on the main body in such a manner that the casing is not disconnected from the main body by relative rotation thereof.

3. A pneumatically operated valve as defined in claim 2, wherein the casing and the main body each have thereon a radially facing annular surface having an annular groove therein, the annular surfaces slidably engaging each other and the grooves therein being aligned, and including a lock ring which is disposed in the aligned grooves.

4. A pneumatically operated valve as defined in claim 1, wherein the piston rod for the piston includes a first member, a second member and connecting means for releasably connecting the first member and the second member, the connecting means including the first member having at one end thereof an engagement sleeve which has a plurality of angularly spaced radial holes therethrough, the second member having an engagement stem which can be slidably inserted in the engagement sleeve, a plurality of engagement balls which are each radially movably supported in a respective said hole through the engagement sleeve, which each have a diameter greater than the radial thickness of the engagement sleeve, and which can each engage a recess provided in the stem, a further sleeve which is slidably supported on the engagement sleeve, and an insert collar slidably supported within the engagement sleeve, insertion of the stem into the engagement sleeve causing the stem to engage and effect axial movement of the insert collar relative to the engagement sleeve.

5. A pneumatically operated valve as defined in claim 4, wherein the valve includes a main body, and wherein the casing is rotatably supported on the main body in such a manner that the casing is not disconnected from the main body by relative rotation thereof.

6. A pneumatically operated valve as defined in claim 4, including a sleevelike bellows, and wherein a substantial portion of one of said first and second members is disposed within the bellows.

7. A pneumatically operated valve as defined in claim 4, wherein said engagement sleeve is provided on one of said first and second members which also has thereon the piston.

8. A pneumatically operated valve as defined in claim 4, wherein said engagement sleeve is provided on one of said first and second members which also has thereon said valve portion.

9. A pneumatically operated valve as defined in claim 4, wherein said further sleeve is integrally provided with an outwardly projecting flange which a suitable tool can engage.

10. A pneumatically operated valve as defined in claim 6, wherein the valve includes a main body, wherein the casing is rotatably supported on the main body in such a manner that the casing is not disconnected from the main body by relative rotation thereof, wherein the casing and main body each have thereon a radially facing annular surface having an annular groove therein, the annular surfaces slidably engaging each other and the grooves therein being aligned, and including a lock ring which is disposed in said aligned grooves.

11. A pneumatically operated valve, comprising a passage through which a fluid can flow, a casing having a piston chamber therein, a piston slidably supported in the piston chamber for reciprocal movement and having a piston rod thereon, the piston rod having a valve portion thereon and the piston being movable between first and second positions in which the valve portion of the piston rod respectively permits and obstructs fluid flow through the passage, means for exerting a force on the piston which yieldably urges it in a predetermined direction toward one of its first and second positions, and means responsive to a predetermined fluctuation of fluid pressure in the passage for effecting movement of the piston by introducing pressurized air into the piston chamber in a manner causing it to act on the piston in a direction opposite the predetermined direction against said force exerted on the piston, wherein the casing in which the piston is slidably accommodated includes a sleevelike cylindrical portion and an upper wall integral with said cylindrical portion, wherein the means for effecting movement of the piston includes an inlet port through which the pressurized air is introduced into the piston chamber in the casing being provided through the cylindrical portion of the casing, including a main body, the main body and the casing each having thereon a radially facing annular surface which has an annular groove therein, the annular surface slidably engaging each other and the grooves therein being aligned, including a lock ring which is disposed in the aligned grooves, whereby the casing can freely rotate relative to the main body, wherein two sealing portions in airtight contact with an inner wall of the casing are provided on an outer surface of the piston in a spaced relationship so that an annular space is formed between them, and wherein the means for effecting movement of the piston includes a controlling passage provided through the piston, one end of said controlling passage opening into said annular space and the other end thereof opening through a surface of the piston which faces generally in said predetermined direction.

12. A fluid operated valve, comprising: a casing having therein a piston chamber and having therein a fluid inlet which opens into said piston chamber; a piston supported in said piston chamber for reciprocal movement between first and second positions, said piston including first and second annular seals which slidably sealingly engage an inner wall of said piston chamber and which are spaced from each other in a direction parallel to the directions of movement of said piston so as to define an annular space therebetween, and said piston having a passage therethrough which communicates at one end with said annular space between said seals and which communicates at its other end with a portion of said piston chamber which is located on one side of said piston and which decreases in volume as said piston moves toward said first position, said fluid inlet being aligned with and in fluid communication with said annular space in all operational positions of said piston; resilient means yieldably urging said piston toward said first position; and valve means having a fluid passage therethrough and responsive to movement of said piston for permitting fluid flow through said passage when said piston is in one of said first and second positions and for obstructing fluid flow through said passage when said piston is in the other of said first and second positions.

13. A fluid operated valve as defined in claim 12, wherein a piston rod extends outwardly from said piston in a direction substantially parallel to said directions of movement of said piston, wherein said piston is releasably secured to a first end of said piston rod, and wherein said valve means is responsive to movement of a second end of said piston rod remote from said first end thereof.

14. A fluid operated valve as defined in claim 13, wherein said resilient means includes a helical compression spring disposed in said piston chamber on a side of said piston remote from said one side thereof, said spring being on a side of said piston nearest said valve means, encircling said piston rod, and having ends which are respectively supported on said piston and on a portion of said casing.

15. A fluid operated valve as defined in claim 13, wherein said resilient means includes a helical compression spring disposed in said piston chamber on a side of said piston remote from said one side thereof, said spring being on a side of said piston remote from said valve means and having ends which are respectively supported on said piston and on a portion of said casing.

16. A fluid operated valve as defined in claim 13, wherein said piston has an opening extending therethrough parallel to said directions of movement thereof, wherein said piston rod has an end portion which is disposed in said opening through said piston and has an annular groove therein, including an annular seal element disposed in said annular groove and sealingly engaging an inner surface of said opening through said piston, and including two snap rings which are releasably snapped into recesses provided in said piston rod at axially spaced locations, said piston being disposed between said snap rings and said snap rings engaging opposite sides of said piston so as to prevent axial movement of said piston relative to said piston rod.

17. A fluid operated valve, comprising: a casing having therein a piston chamber; a piston supported in said piston chamber for reciprocal movement between first and second positions and slidably sealingly engaging an inner surface of said piston chamber; a piston rod which projects outwardly from said piston parallel to said directions of movement thereof; means for effecting reciprocal movement of said piston within said piston chamber; and valve means having a fluid passage therethrough and responsive to movement of an end of said piston rod remote from said piston for permitting and obstructing fluid flow through said passage when said piston is respectively in its first and second positions; wherein said piston rod includes first and second parts and coupling means for releasably coupling said first and second parts at a location between said piston and said valve means; wherein said coupling means includes an engagement sleeve which is provided on an end of said first part of said piston rod and which has a radially extending hole therethrough, an engagement ball which is radially movably supported in said hole through said engagement sleeve and has a diameter greater than the radial thickness of said engagement sleeve, an engagement stem which is provided on an end of said second part of said piston rod, which can be inserted into said engagement sleeve with a close fit, and which has in an external surface thereof a recess which can receive a portion of said engagement ball when said stem has been inserted into said engagement sleeve, means for yieldably urging said engagement ball radially inwardly relative to said engagement sleeve, and means for limiting radially inward movement of said engagement ball relative to said engagement sleeve; wherein said means for yieldably urging said engagement ball radially inwardly relative to said engagement sleeve includes a further sleeve closely encircling and axially slidably supported on said engagement sleeve, said further sleeve having thereon an inwardly facing surface which is engageable with said engagement ball and which includes an inclined surface portion and a further surface portion, said inclined surface portion being adjacent and merging into said further surface portion, means for yieldably urging movement of said further sleeve in a predetermined axial direction relative to said engagement sleeve, and means for preventing movement of said further sleeve in said predetermined direction past a predetermined position relative to said engagement sleeve, wherein during movement of said further sleeve in said predetermined direction toward said predetermined position said inclined surface portion moves said engagement ball radially inwardly to a radially inner position, and wherein when said further sleeve is in said predetermined position said further surface portion is aligned with an engaging said engagement ball and maintains said engagement ball in its radially inner position; and including an insert member slidably supported within said engagement sleeve for axial movement relative thereto from a position axially aligned with said engagement ball to a position axially spaced from said engagement ball, wherein when said insert member is in said position axially aligned with said engagement ball said insert member engages said engagement ball and holds said engagement ball in a position spaced radially outwardly from said radially inner position of said engagement ball, and wherein as said stem is inserted into said engagement sleeve said stem engages said insert member and moves said insert member from said position axially aligned with said engagement ball to said position axially spaced from said engagement ball.

18. A fluid operated valve as defined in claim 17, wherein said engagement sleeve has a plurality of said radial holes therethrough at angularly spaced locations, including a plurality of said engagement balls which are each radially movably supported in a respective said hole in said engagement sleeve, wherein said recess in said stem is an annular groove therein, and wherein said inclined surface portion and said further surface portion on said further sleeve are each annular and encircle said engagement sleeve.

* * * * *

UNITED STATES PATENT AND TRADEMARK OFFICE
CERTIFICATE OF CORRECTION

PATENT NO. : 4 712 576

DATED : December 15, 1987

INVENTOR(S) : Ryozo Ariizumi et al

It is certified that error appears in the above-identified patent and that said Letters Patent is hereby corrected as shown below:

Column 14, line 22; change "an" to ---and---.

Signed and Sealed this

Fourteenth Day of June, 1988

Attest:

DONALD J. QUIGG

*Attesting Officer*  *Commissioner of Patents and Trademarks*